(12) United States Patent
Wu et al.

(10) Patent No.: US 10,025,667 B2
(45) Date of Patent: Jul. 17, 2018

(54) MANAGEMENT OF STORAGE DEVICES

(71) Applicant: EMC IP HOLDING COMPANY LLC, Hopkinton, MA (US)

(72) Inventors: Alan Zhongjie Wu, Beijing (CN); Colin Yong Zou, Beijing (CN); Chris Zirui Liu, Beijing (CN); Zhengli Yi, Beijing (CN); James Fei Wu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/971,107

(22) Filed: Dec. 16, 2015

(65) Prior Publication Data

US 2016/0179644 A1 Jun. 23, 2016

(30) Foreign Application Priority Data

Dec. 19, 2014 (CN) .......................... 2014 1 0813709

(51) Int. Cl.
*G06F 11/00* (2006.01)
*G06F 11/10* (2006.01)
*G06F 3/06* (2006.01)

(52) U.S. Cl.
CPC ........ *G06F 11/1088* (2013.01); *G06F 3/0619* (2013.01); *G06F 3/0647* (2013.01); *G06F 3/0689* (2013.01); *G06F 11/1092* (2013.01); *G06F 2211/1057* (2013.01)

(58) Field of Classification Search
CPC ............. G06F 11/1088; G06F 11/0727; G06F 11/1092; G06F 11/1612; G06F 11/203; G06F 11/2061; G06F 11/2094; G06F 3/0689; G06F 3/0619; G06F 3/0647; G06F 2211/1057
USPC ............... 714/6.22, 6.2, 6.24, 6.31, 6.32, 42
See application file for complete search history.

(56) References Cited

U.S. PATENT DOCUMENTS

| | | | |
|---|---|---|---|
| 6,839,827 B1* | 1/2005 | Beardsley ............. | G06F 3/0605 711/114 |
| 8,261,016 B1* | 9/2012 | Goel .................... | G06F 11/1088 711/110 |
| 2008/0151724 A1* | 6/2008 | Anderson ............ | G11B 33/127 369/53.42 |
| 2012/0066449 A1* | 3/2012 | Colgrove ................ | G06F 3/061 711/114 |
| 2012/0084600 A1* | 4/2012 | Kidney ............... | G06F 11/1088 714/6.13 |

* cited by examiner

*Primary Examiner* — Joseph D Manoskey
(74) *Attorney, Agent, or Firm* — Krishnendu Gupta; Konrad Lee; Lesley A. Leonessa

(57) ABSTRACT

Embodiments of the present disclosure relate to a method, a computer program product and apparatus for management of a storage device by collecting bad storage units to be reconstructed in the storage device; determining a reconstruction priority level for each of the collected bad storage units; and scheduling reconstruction of the bad storage unit based on the determined reconstruction priority level.

19 Claims, 14 Drawing Sheets

_US 10,025,667 B2_

MANAGEMENT OF STORAGE DEVICES

RELATED APPLICATION

This application claim priority from Chinese Patent Application Number CN201410813709.3, titled "METHOD AND APPARATUS FOR MANAGEMENT OF STORAGE DEVICES" filed on Dec. 20, 2014 at the State Intellectual Property Office, China, the contents of which are herein incorporated by reference in entirety

FIELD OF THE INVENTION

Embodiments of the present disclosure relate to the field of storage.

BACKGROUND OF THE INVENTION

Generally with a capacity increase of storage devices, data protection may have become worse. The reason may be that the capacity increase of the storage device (e.g., a disk) causes an increasingly longer time period required for reconstructing the storage device upon failure. The longer reconstruction time period means higher risks for data on the storage device such as Redundant Array of Independent Disks (RAID).

Generally during a reconstruction time period, data reliability may be reduced dramatically due to loss of redundancy information. As an example, consider RAID-6 to see change of data reliability in case of disk failure. Referring to FIG. 1, it can be seen that RAID-6 can tolerate 2 disks failure simultaneously, thanks to existence of redundancy information when no disk fails. Once one disk fails, reconstruction need to be started and RAID comes into a degraded state. However, for RAID-6 there may still be redundancy information available, so even g in a degraded state, it may still be able to tolerate failure of one disk. Unfortunately, during a reconstruction period, if another disk also fails, that will get RAID into an inferior state, in which the RAID cannot tolerate any more disk failure. A graver situation may be that the RAID may stay in this inferior/poorer state for a long time until the first failure disk completes its reconstruction. For this reason, there may be a high risk of data loss in such a state, and it therefore becomes hard to guarantee reliability of data on the RAID. FIG. 1 schematically illustrates the following three states of a RAID-6:

1) The first state can be called a robust state. In this state, RAID can tolerate simultaneous failure of two disks. If none of its disks fails, the RAID should be in this state.

2) The second state can be called a safe state. In this state, RAID can tolerate failure of one disk.

3) The third state can be called a vulnerable state. In this state, RAID cannot tolerate failure of any disk any more.

Both the second and the third states are considered as a degraded state for RAID, and the time period of remaining in a vulnerable state without any redundancy protection may be too long. Similar problems may also exist with other storage devices. With capacity increase of storage devices, reconstruction time becomes longer and longer, so does the time duration of staying in the vulnerable state, and makes data reliability poorer.

SUMMARY OF THE INVENTION

Embodiments of the present disclosure provide a system, a computer program product and a method for management of a storage device by collecting bad storage units to be reconstructed in the storage device; determining a reconstruction priority level for each of the bad storage units; and scheduling reconstruction of the bad storage units based on the determined reconstruction priority level.

BRIEF DESCRIPTION OF DRAWINGS

Some embodiments of methods and/or apparatuses according to embodiments of the present disclosure will be described, by way of examples only, and with reference to figures. In the figures.

DETAILED DESCRIPTION

Figure 1:
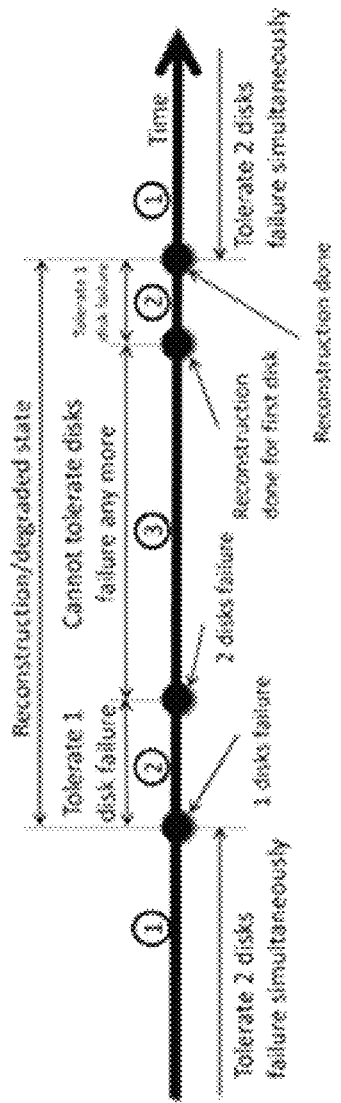
FIG. 1 is an exemplary schematic diagram showing changes of data reliability upon disk failure.

Various exemplary embodiments of the disclosure will be described in details below with reference to the figures. It should be understood that these exemplary embodiments are provided only for those skilled in the art to better understand and thus implement the disclosure, rather than for limiting the scope of the disclosure in any manner.

References in the specification to "one embodiment", "an embodiment", "a preferred embodiment" etc., indicate that the embodiment described may include a particular feature, structure, or characteristic, but each embodiment may not necessarily include the particular feature, structure, or characteristic. Moreover, such phrases are not necessarily referring to the same embodiment.

It should also be understood that various terminology used herein is for the purpose of describing particular embodiments only and is not intended to be liming of any example embodiments. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description.

Furthermore, in the following description, some functions or structures well-known to those skilled in the art will be omitted in order not to obscure embodiments of the disclosure in the unnecessary details.

Embodiments of the present disclosure relate to improvements to management of storage devices, and may be used to reduce the reconstruction time and improve data reliability. Embodiments of the present disclosure provide a solution that may reduce reconstruction time and may also improve data reliability.

Embodiments of the present disclosure may include a system, a computer program product and a method for management of a storage device by collecting bad storage units to be reconstructed in the storage device. A further embodiment may include determining a reconstruction priority level for each of the bad storage units. A further embodiment may include scheduling reconstruction of bad storage units based on a determined reconstruction priority level.

According to some embodiments, a storage device may be a de-clustered Redundant Array of Independent Disks (RAID), and bad storage unit may be a bad stripe.

According to a further embodiment, the method may include determining and collecting bad storage units to be reconstructed by scanning a map tree or a remap tree of a storage device for collecting bad storage units to be reconstructed in a storage device.

According to a further embodiment, in the method may include determining a reconstruction priority level for each bad storage unit based on whether a bad storage unit is located at a medium error detected area in a storage device, and/or based on a number of damaged sub-storage units included in a bad storage unit, for determining a reconstruction priority level for each of the bad storage units.

According to a further embodiment, a storage device may include a plurality of array objects. IN a further embodiment, the step of determining a reconstruction priority level for each storage unit in the bad storage units may include managing a bad storage unit pool for each array object of a storage device, for maintaining information of all bad storage units for reconstruction. A further embodiment may include dividing bad storage units in a bad storage unit pool into a plurality of schedule groups with different priority levels.

According to a further embodiment scheduling reconstruction of a bad storage unit based on the determined reconstruction priority level may include selecting a schedule group to be reconstructed according to a descending order of priority levels of a plurality of schedule groups a further embodiment may include upon selecting a schedule group to be constructed, executing reconstruction sequentially for all bad storage units in the selected schedule group. In a further embodiment, upon selecting a schedule group to be constructed, executing reconstruction sequentially for all bad storage units in the selected schedule group may include upon selecting a schedule group to be constructed, selecting a block stripe sequentially from the selected schedule group, wherein a block stripe may include a plurality of continuous storage units. A further embodiment may include executing reconstruction sequentially for all bad storage units in the selected block stripe.

A further embodiment may include scheduling reconstruction in parallel for each array object in the plurality of array objects included in the storage device.

In some embodiments, a storage device may be divided into a logical domain and a physical domain, wherein the logical domain may be used for implementing data protection and the physical domain may be used for managing the physical storage device In some other embodiment, a logical domain may include array objects that may be built based on a plurality of logical unit numbers LUNs. A further embodiment may include an address space of LUNs hat may be divided into multiple blocks. A further embodiment may include each block comprising a plurality of sub-storage units. A further embodiment may include a plurality of sub-storage units from different LUNs form one of said storage units. A further embodiment may include a plurality of blocks from different LUNs form a block stripe. A further embodiment may include a physical domain comprising a plurality of physical storage devices. A further embodiment may include each of a plurality of physical storage devices comprising a plurality of chunks. A further embodiment may include blocks in a logical domain that may be mapped to chunks in a physical domain.

According to a further embodiment, there may be provided an apparatus for management of a storage device. A further embodiment may include a bad storage unit collector that may be configured to collect bad storage units to be reconstructed in a storage device. A further embodiment may include a priority controller at may be configured to determine a reconstruction priority level of each of the bad storage units. A further embodiment may include a reconstruction scheduler that may be configured to schedule reconstruction of bad storage units based on a determined reconstruction priority level. According to a further embodiment, the apparatus may be capable of executing the method disclosed above.

According to a further embodiment of the present disclosure, there may be provided an apparatus for management of a storage device, that may include at least one processor; and at least one memory that may include a computer program code, wherein the at least one memory and the computer program code may be configured, with the at least one processor, to cause the apparatus to implement any method disclosed above. A further embodiment may include a computer program product that may be embodied in a computer-readable medium and comprises program instructions that may implement any method disclosed above when being loaded into the apparatus. According to embodiments of the disclosure, the reconstruction time of the storage device may be reduced dramatically, and reliability of data stored therein may be significantly improved.

To facilitate explanation, the main principle of the present disclosure may be described by mainly by referring to a Redundant Array of Independent Disks (RAID), particularly an RAID-6 type RAID. However, those skilled in the art may appreciate that the present disclosure is not limited to examples disclosed here, and may be applied more widely. For example, the method and apparatus according to the present disclosure may be applied to any storage device so long as it is compatible with features mentioned herein.

In one embodiment, in order to reduce duration time of a RAID staying in a vulnerable state, priority of damaged storage units (e.g., bad stripes in RAID) in the storage device has been researched, and optimization of the reconstruction process based on the priority may be proposed, specifically to reduce duration time of staying in an inferior/poorer/faultier (worse) state. In an embodiment according to a traditional RAID design, priority of bad stripes may not be taken into consideration. In an example embodiment, in conventional designs, when a RAID fails, all bad stripes found may be reconstructed in turn by scanning all of them one by one from begin to end. Some embodiments may show that the bad stripes may be assigned different priority levels for at least the following two reasons:

1) distribution of medium errors in a storage device may have locality;
2) an individual bad stripe may have different severity levels.

The two aspects may be described in detail as follows.

1. Locality of medium errors on the storage device—By analyzing data from customer cases on the storage device, the following two interesting phenomena may be found:

(1) Most of storage devices with failure, e.g., failed disks, may be just partially failed, which means just partial sectors on disk really have medium errors, while the rest of disk space may still be readable. By this feature, even if 3 disks failed for RAID-6, most of data still may be rescued from failed disks.

(2) The distribution of sectors with medium error on a failure disk may have locality. For example, if a sector with medium error has been detected on a disk, then those nearby sectors may be corrupted with high probability.

Figure 2:
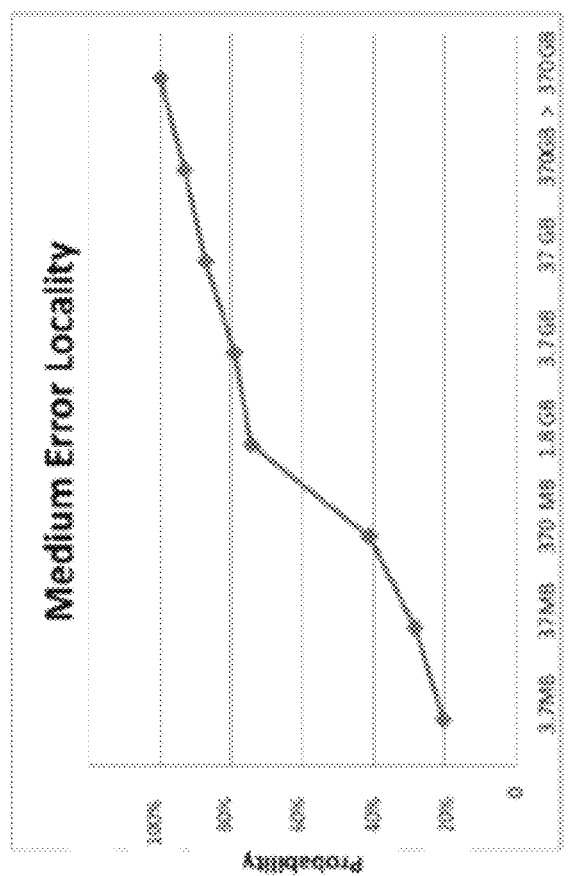
FIG. 2 illustrates an exemplary statistic data about distribution probability of bad stripes.

Statistic data about distribution probability of bad stripes in FIG. 2 show that most of bad stripes with medium errors are localized in a certain range. It can be found from the example shown in FIG. 2 that 80% of bad stripes with medium error are located in a range of 3.7 GB, and almost 85% of bad stripes with medium error are located in a range of 37 GB. For instance, for a 2 TB disk, bad stripes are concentrated on a 37 GB region, which means the distribution of bad stripe has visible locality. In some embodiments, the locality of bad stripes may be exploited to improve data reliability. In an example embodiment, those bad stripes in the range of a medium error detected area may be assigned a higher priority for reconstruction, which may reduce data loss risks dramatically for the storage device (e.g., RAID).

2. Severity level for bad stripes

Figure 3:
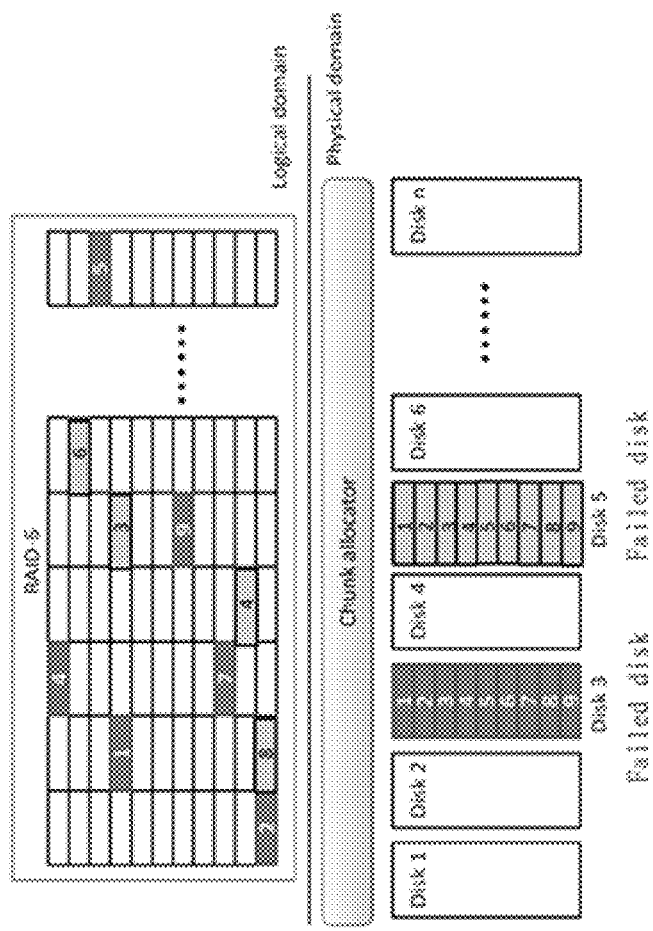
FIG. 3 schematically illustrates an exemplary different severity of band stripes.

FIG. 3 schematically illustrates different severity of bad stripes. In the example shown in FIG. 3, it is assumed that the de-clustered RAID be used, and a logical domain and a physical domain of the storage device are separated. The logical domain is responsible for data protection and the physical domain is used for management of physical storage devices (e.g., physical disks in the example). The two-layer structure can be illustrated in FIG. 3. As shown in FIG. 3, if two disks fail simultaneously, some stripes will be corrupted with two bad stripe units (SUs) and some stripes will be corrupted with just one bad SU. For this reason, severity levels for different bad stripes are different. For example, if Disk-3 and Disk-5 failed and are removed from the system, multiple stripes will be affected and need to be reconstructed. As can be seen from FIG. 3, partial bad stripes have two bad SUs and others have only one bad SU. If those stripes with two bad SUs can be reconstructed with higher priority as fast as possible, the RAID can tolerate more disks with failure after those critical bad stripes are recovered.

In some embodiments, drawing conclusions from the above, from a perspective of a physical storage device (e.g., disk), medium error thereon may have locality, and accordingly, those bad stripes located in the medium error detected area may be assigned a higher priority for reconstruction. In an additional embodiment, from an individual bad stripe point of view, each bad stripe may have its own severity level. In an example embodiment, for RAID-6, those bad stripes with two bad SUs may be considered as having a higher severity level, and therefore may be assigned a higher propriety for reconstruction as compared with bad stripes with a single bad SU.

In some embodiments, after bad stripes may be assigned different priority levels, those bad stripes with high priority levels may be reconstructed first. In some other embodiments, once these bad stripes have been recovered, the storage device (e.g., RAID) may tolerate more units (e.g., disks) that may fail.

Figure 4:
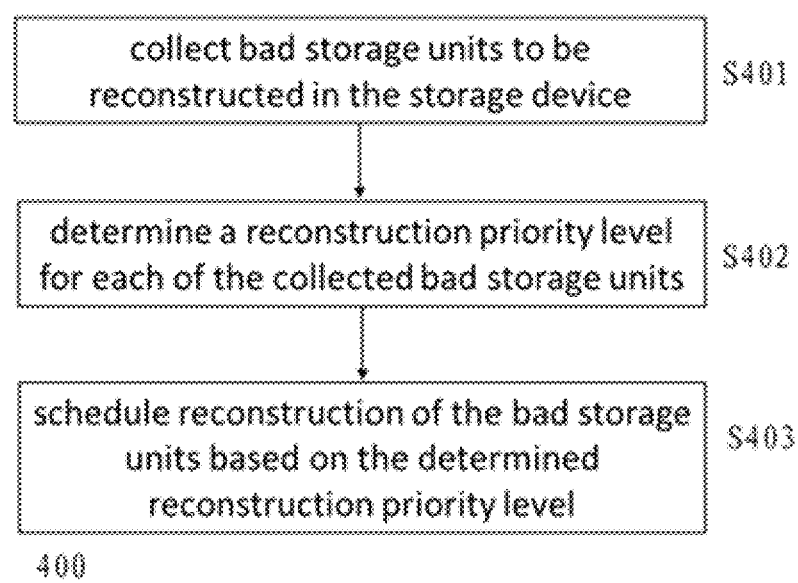
FIG. 4 schematically illustrates a flow chart of an exemplary method according to an embodiment of the present disclosure.

Based on the above observation and results, embodiments of the present disclosure propose a method for management of a storage device, which will be described below with reference to FIG. 4. As shown in FIG. 4, the method 400 comprises step S401 of collecting bad storage units to be reconstructed in the storage device, e.g., the bad stripes in the RAID; step S402 of determining a reconstruction priority level for each bad storage unit in the bad stripes; and step S403 of scheduling reconstruction of the bad storage unit based on the determined reconstruction priority level.

According to an embodiment of the present disclosure, a storage device may be a de-clustered Redundant Array of Independent Disks (RAID), e.g., RAID-6, and bad storage units therein may be for example bad stripes. However, embodiments of the present disclosure may not be limited to this, but may be applied to other storage devices that may currently exist or to be developed in the future, so long as they may be compatible with features of embodiments of the present disclosure disclosed herein.

According to a further embodiment, in step S401, bad storage units, such as bad stripes, to be reconstructed may be collected by scanning a map tree or a remap tree of a storage device. For example, in an embodiment of the present disclosure, step S401 may be triggered based on two conditions:

Condition 1: A physical storage device such as a disk failed while a system is running. A physical disk is taken as an example, since each physical disk has a remap tree to describe chunk usage therein, and once a physical disk fails, a remap tree can be searched to get all bad stripes for all arrays.

Figure 5:
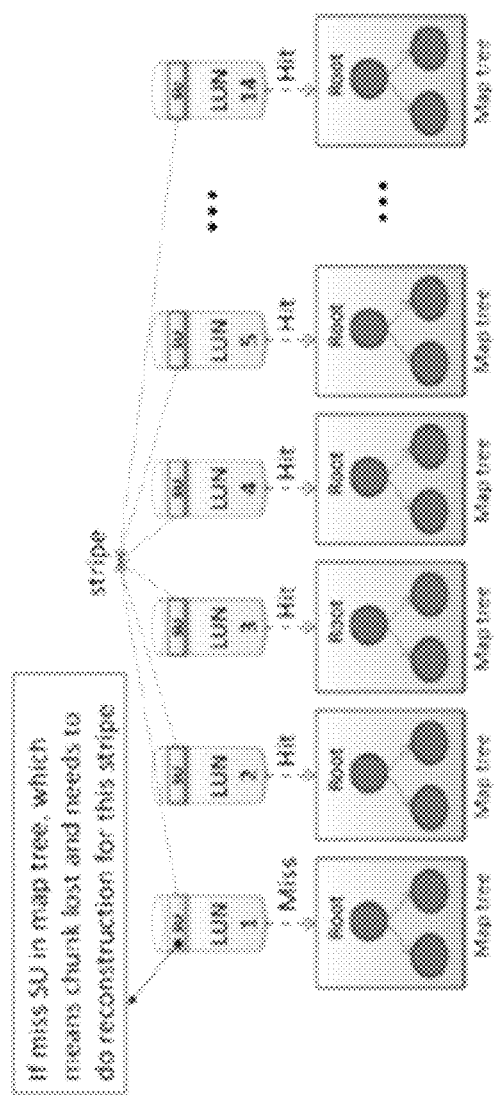
FIG. 5 illustrates a schematic diagram of collecting bad stripes based on map trees according to an embodiment of the present disclosure.

Condition 2: Missing of a physical storage device (e.g., the disk) may be detected after system reboots and reassembling of the storage device. This case may not be handled by a remap tree of a physical disk. But, for example, in a RAID, a very important characteristic may be used to handle this. As FIG. 5 shows, if a certain SU cannot be found in a map tree of a storage device, but other SUs in a same stripe may be found in their map tree, then it may mean loss of a chunk and a reconstruction may be required. So after the system reboots, step S401 needs to be executed to scan map trees (of for example all logic units (LUNs)) to check whether data loss may have occurred/happened. With this method, the overhead of step S401 is minimized, since all data for a map tree and a remap tree may be stored in the memory.

In a further embodiment of the present disclosure, step S402 may include: determining a reconstruction priority level for each bad storage unit based on whether each bad storage unit (e.g., bad stripe) may be located at a medium error detected area on a storage device, and/or determining a reconstruction priority level for each bad storage unit based on a number of damaged sub-storage units (e.g., bad SUs) included in each bad storage unit. In a further embodiment, for example, bad stripes located at a medium error detected area on a storage device may be assigned higher priority levels as compared with bad strips outside an area. In a further embodiment, again for example, bad strips including more bad SUs may be assigned higher priority levels. In a further embodiment, considering RAID-6 as an example, bad stripes therein may be set at five priority levels as shown in Table 1 below:

TABLE 1

An Example of Priority Levels of Bad Stripes

| Priority | Bad strips |
| --- | --- |
| 1 (highest) | Stripes with more than 2 bad SUs |
| 2 | Stripes with 2 bad SUs in the range of a medium error detected area |
| 3 | Normal stripes with 2 band SUs |
| 4 | Stripes with 1 bad SU in the range of a medium error detected area |
| 5 | Normal stripes with 1 band SU |

In the example illustrated in Table 1, stripes with the highest priority level for reconstruction are those with more than 2 bad SUs. Regarding a storage device with a higher redundancy degree, e.g., a storage device such as RAID, which can tolerate more than two disk errors, reconstruction can be performed for stripes with more than two bad SUs. Furthermore, recovery of this type of bad stripes will enable a storage device to tolerate other disk errors and get away from a vulnerable state. In this case, this type of bad stripes may be assigned the highest reconstruction priority level and reconstructed with priority.

Regarding a storage device with a slightly lower redundancy degree, for example, a storage device that cannot tolerate more than two disk errors, special handling may be performed for the highest priority level shown in Table 1, for example, it is skipped during reconstruction so as to expedite reconstruction of other bad storage units. The stripes with second high priority level for reconstruction are those with two bad SUs and those stripes are also located in a range of a medium error detected area. As stated above, medium errors on a disk have locality, and stripes with two bad SUs are also very dangerous/risky/threatening for RAID-6. Because of this, those bad stripes should be reconstructed with high priority (e.g., the second high priority level). The stripes with the third high priority level for reconstruction are those with two bad SUs. Stripes with two bad SUs make RAID-6 stay in a vulnerable state without any redundancy protection. By dealing with those bad stripes first, the time of staying in the vulnerable state can be shorten.

The stripes with the fourth priority level for reconstruction are those with one bad SU and those stripes are also located in a range of a medium error detected area. The distribution of medium error on disk has locality. So those bad stripes inside the area should be recovered as fast as possible. The stripes with the lowest priority level for reconstruction are those with one bad SU. Those stripes make RAID-6 stay in the safe state with redundancy protection. Because of this, those bad stripes can be handled with the lowest priority level.

It should be noted that Table 1 is presented only as an example. In fact, definitions of other priority levels may be used according to embodiments of the present disclosure. For example, only four priority levels, namely, levels 1-4, may be defined, and they are made correspond to the priority levels 2, 3, 4 and 5 shown in Table 1 respectively.

According to a further embodiment of the present disclosure, a storage device may include a plurality of array objects, and step S402 may further include: for each array object of a storage device, managing a bad storage unit pool (e.g., bad stripe pool) for maintaining information of all bad storage units for reconstruction. A further embodiment may include dividing bad storage units in a bad storage unit pool into a plurality of schedule groups with different priority levels. In a further embodiment, for example, consider a data domain de-clustered RAID, the RAID may be divided into a logical domain and a physical domain. In a further embodiment, data protection may be implemented in the logical domain so as to output the array object. In a further embodiment, for example, RAID-6 algorithm may be used to enable high reliability of data. In a further embodiment, inside each array object, there may be a bad stripes pool managed. In a further embodiment, in order to divide bad stripes into groups with different priorities, five schedule groups may be managed inside a bad stripes pool, wherein each schedule group may have a different priority level. In a further embodiment, for example, a schedule group with a highest priority level may manage all stripes with more than two bad SUs to be reconstructed and a schedule group with a lowest priority level may manage all stripes with one bad SU.

In some embodiments of the present disclosure, in step S403, scheduling reconstruction of a bad storage unit may be based on a determined reconstruction priority level that may include selecting a schedule group to be reconstructed according to a descending order of the priority levels of the plurality of schedule groups. A further embodiment may include selecting a schedule group to be constructed, executing reconstruction sequentially for all bad storage units (e.g., bad stripes) in a selected schedule group.

In another embodiment of the present disclosure, step S403 may further include, after selecting a schedule group to be constructed, selecting a block stripe sequentially from the selected schedule group, wherein a block stripe comprises a plurality of continuous storage units (e.g., stripes); executing reconstruction sequentially for all bad storage units (e.g., bad stripes) in a selected block stripe.

In some embodiment, priority-based reconstruction is implemented by a method for management of the storage device. In a further embodiment, priority-based reconstruction may be scheduling bad storage units to be reconstructed. In a further embodiment, by using a method of priority-based reconstruction, a process of reconstruction may become smart enough to select a suitable scheduling order for reconstructing a bad storage unit (e.g., bad stripe), instead of just starting from begin to end to do data recovery sequentially. In one embodiment, for example, after those critical bad stripes in the RAID may be handled, RAID may step out more quickly from a vulnerable state into a safe state. In a further embodiment, since the duration time of a vulnerable state becomes shorter, data reliability may be improved while RAID may be in the degraded state.

According to a further embodiment of the present disclosure, in step S403, scheduling reconstruction of a bad storage unit based on a determined reconstruction priority level may include executing a schedule reconstruction in parallel for each of a plurality of array objects included by the storage device. In some other embodiments of the present disclosure, a schedule reconstruction may be executed in series for a plurality of array objects included by a storage device.

Figure 6:
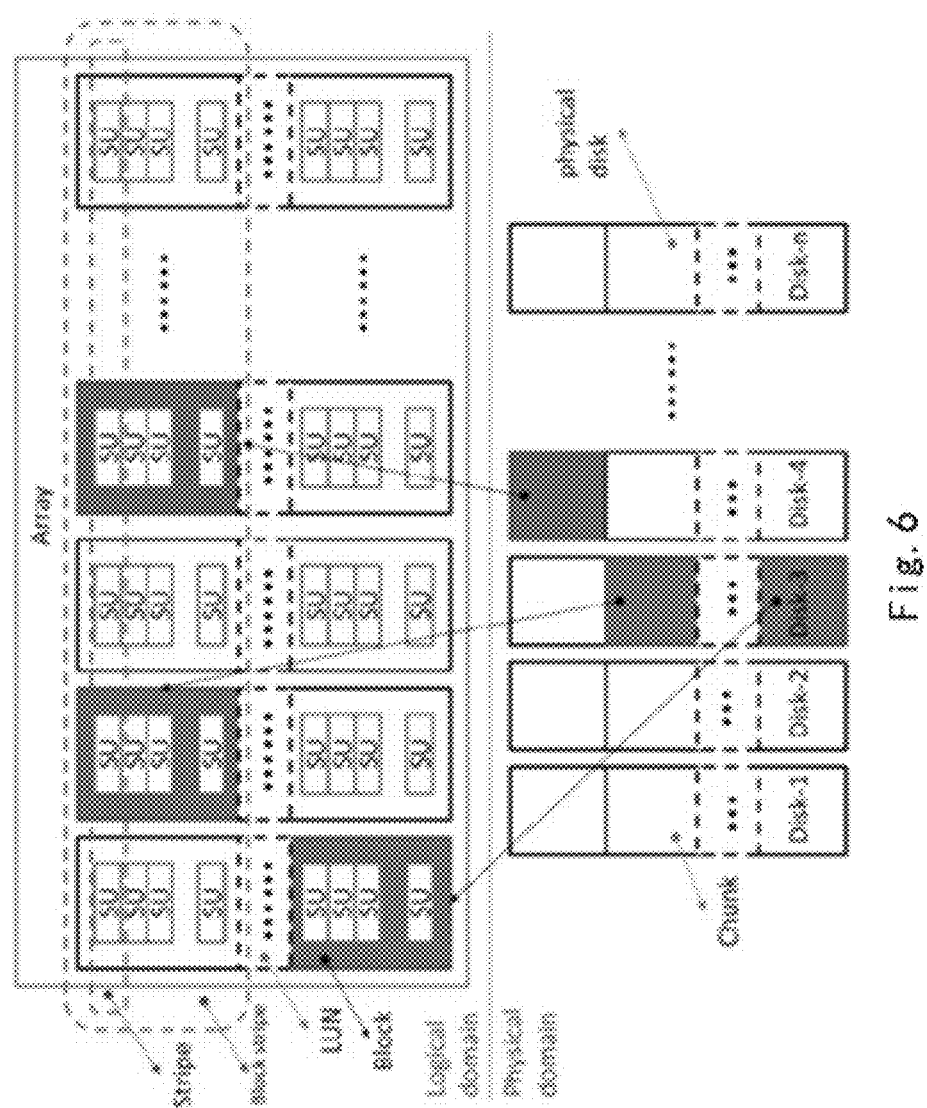
FIG. 6 illustrates an exemplary schematic diagram about scheduling block stripes for reconstruction according to an embodiment of the present disclosure.

In a further embodiments of the present disclosure, the storage device (e.g., the RAID) may be divided into a logical domain and a physical domain, wherein the logical domain is used to implement data protection and the physical domain is used to manage the physical storage device (e.g., disk). In a further embodiment, a logical domain may include array objects that may be built based on a plurality of logical unit numbers (LUNs). In a further embodiment, an address space of a LUN may be divided into multiple blocks. In a further embodiment, each block may include a plurality of stripe units (SU). In a further embodiment, a plurality of SUs from different LUNs may form one of said storage units (e.g., stripe), and a plurality of blocks from different LUNs may form a block stripe. In a further embodiment, a physical domain may include a plurality of physical storage devices (e.g., physical disks). In a further embodiment, each of a plurality of physical storage devices may include a plurality of chunks. In a further embodiment, blocks in a logical domain may be mapped to the chunks in the physical domain. FIG. 6 illustrates an example. FIG. 6 shows a relationship between block, chunk, SU, LUN and physical disks. As can be seen from FIG. 6, multiple SUs from different LUNs make up a stripe, and multiple blocks from different LUNs make up a block stripe. Even though stripe is the basic granularity to do reconstruction, elements to be scheduled in schedule group may be a block stripe, which comprises a set of stripes.

The exemplary structure shown in FIG. 6 can be regarded as one type of the de-clustered RAID. The structure improves reconstruction performance dramatically by separating a data protection domain and a physical disks management domain. In the example of FIG. 6, if Disk-3 and Disk-4 are fail in the RAID, several block-stripes may be corrupted with two bad blocks, and several block-stripes will be corrupted with one bad block. Because of this, block-stripes can be scheduled as stripe groups to do reconstruction. Different schedule groups have different priority levels; in a schedule group, block-stripes are scheduled one by one, and inside block-stripes, bad stripes will be reconstructed from begin to end sequentially.

In one embodiment, for example, as described above with regard to step S402, a bad stripes pool may include several schedule groups, and each group may have different priority. In a further embodiment, an element inside a schedule group is a block-stripe, which may include a lot of continuous stripes.

According to an embodiment of the present disclosure, step S403 may further comprise:
Access bad stripes pool to get a set of stripes to be reconstructed;
Select an available schedule group with a highest priority level. For example, if an available schedule group with two bad SUs has the highest priority, then it may be selected for use.
Once a schedule group is selected, a first element inside a schedule group may be used. The element may be a block stripe, which may include multiple bad stripes.
After a block-stripe is picked up from a schedule group, a reconstruction thread may reconstruct all bad stripes inside a block stripe one by one from begin to end.

In addition, according to the embodiment of the present disclosure, in order to roll-back a reconstruction to a right place after system reboot, check point may need to be updated into chunk metadata during block stripe reconstruction time period.

Figure 7:
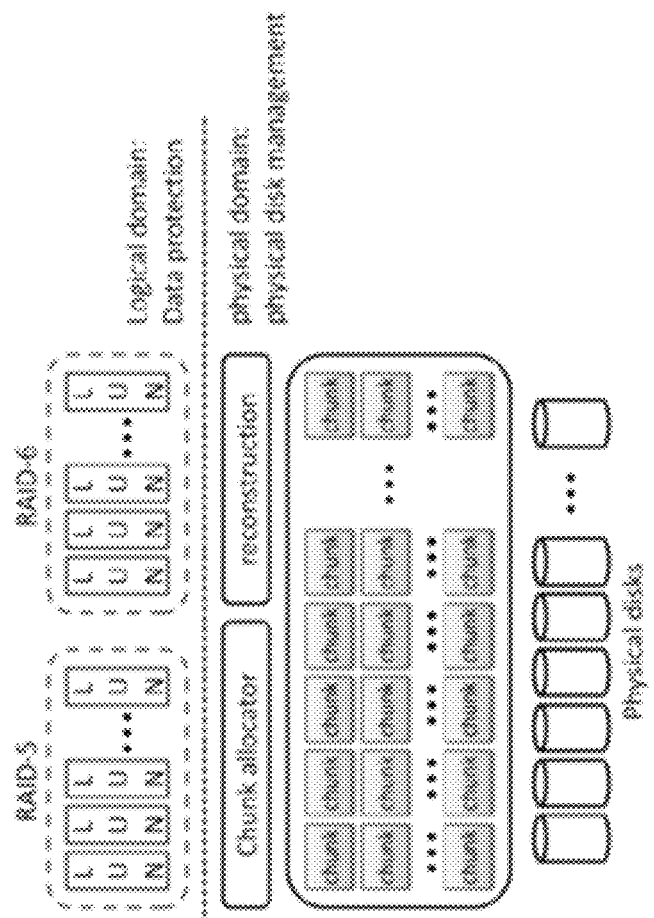
FIG. 7 illustrates a schematic diagram showing an exemplary architecture of a declustered RAID according to an embodiment of the present disclosure.

FIG. 7 illustrates another schematic diagram of a de-clustered RAID in which the method according to the embodiment of the present disclosure may be applied. Similar to FIG. 6, in the structure, a logical domain is used to implement data protection, and a physical domain is responsible for physical disks management. A bridge between the logical domain and the physical domain is a chunk allocator. Blocks inside a logic unit number (LUN) in the logical domain are mapped into chunks in the physical domain by a chunk allocator. While the physical disk fails, by using the method of the embodiment of the present disclosure, affected bad stripes for all arrays can be collected and then reconstruction may be done by all arrays in parallel. Since array data can be distributed into disks randomly and all disks can take part in reconstruction in case of disk failure, reconstruction performance and data reliability for the de-clustered RAID may be significantly improved.

In summary, in some embodiments, RAID may be taken as an example. In a further embodiment, a block stripe may be a schedule element in a list with a specific priority level. In a further embodiment, for each array, there may be multiple lists to manage block stripes with different priority levels, for example, each list may correspond to a schedule group. In a further embodiment, during reconstruction, block stripes may be scheduled from high priority list to low priority list. In a further embodiment, once a block stripe is selected, bad stripes inside the block stripe may be reconstructed from begin to end inside specific block stripe.

In one embodiment, for a selected bad stripe, a specific method for reconstruction may be identical with a conventional method. In a further embodiment, consider RAID-6 as an example, even though three disks fail, an attempt may still be made to regenerate data and write it into a new place by using copy reconstruction and/or full reconstruction, and the new place may be allocated by an allocator. In a further embodiment, copy reconstruction may be referred to as a method to copy data from failed disks to recover data. In a further embodiment, full reconstruction may be referred to as a method to read data from survivals, and then regenerate lost data by reading data. In a further embodiment, considering that most of failed disks may partially fail currently, data inside the failed disks may still readable. In a further embodiment, for stripes with more than 2 bad SUs, copy reconstruction and traditional full reconstruction method may be combined to recover data.

Figure 8:
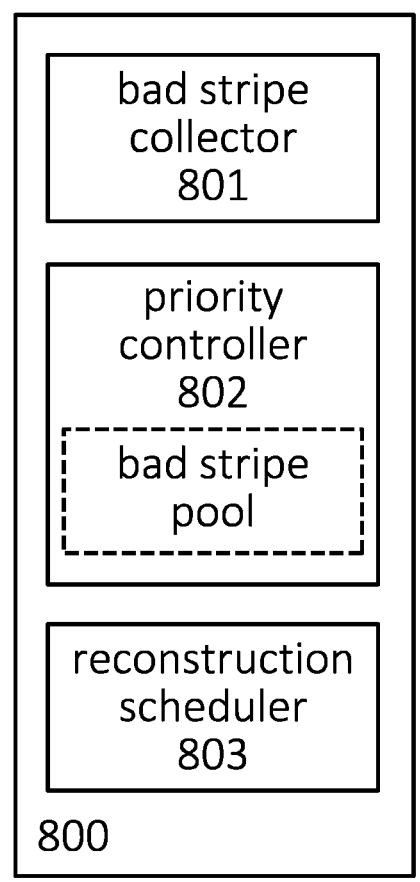
FIG. 8 schematically illustrates a block diagram of an exemplary apparatus according to an embodiment of the present disclosure.

The method for management of the storage device according to embodiment of the present disclosure is described with reference to figures. Apparatus 800 for management of the storage device according to embodiment of the present disclosure will be described with reference to FIG. 8. FIG. 8 schematically illustrates the structure of apparatus 800. Apparatus 800 may be configured to implement any method described above with reference to FIG. 4, but not limited to implementing the above-described method. Similarly, the aforesaid method may be implemented by apparatus 800, but not limited to being implemented by apparatus 800.

As shown in FIG. 8, apparatus 800 comprises bad storage unit collector 801 configured to collect bad storage units (e.g., bad stripes) to be reconstructed in the storage device; priority controller 802 configured to determine a reconstruction priority level for each of the bad storage units; and reconstruction scheduler 803 configured to schedule reconstruction of the bad storage units based on the determined reconstruction priority level.

According to an embodiment of the present disclosure, a storage device may be a de-clustered Redundant Array of Independent Disks (RAID), e.g., RAID-6, and bad storage units are bad stripes. However, embodiments of the present disclosure are not limited to this, but may be applied to other storage devices, which exist currently or to be developed in the future, so long as they have similar problems and are compatible with features of embodiments of the present disclosure.

According to another embodiment of the present disclosure, bad storage unit collector 801 (e.g., the bad stripe collector) may be configured to collect bad storage units to be reconstructed by scanning a map tree or a remap tree of the storage device. For example, in an embodiment of the present disclosure, bad storage unit collector 801 may be triggered to operate based on the following two conditions:

Condition 1: A physical storage device such as a disk fails during system running. This case can be easily handled. Consider a physical disk as an example, since each physical disk has a remap tree to describe chunk usage therein. Once a physical disk fails, the remap tree can be searched to get all bad stripes for all arrays.

Condition 2: System reboots, and the physical storage device (e.g., the disk) missing is found after the storage device is reassembled. This case cannot be handled by a remap tree of the physical disk. But, for example in RAID, a very important characteristic may be exploited to handle this. As FIG. 5 shows, if a certain SU cannot be found in a map tree of a storage device, but other SUs in same stripe can be found in their map tree, that means the chunk gets lost and reconstruction is required. Therefore, after the system reboot, bad stripe collector 801 needs to execute step S401 in FIG. 4 to scan the map trees (of for example all logic units LUNs) to check whether data loss has occurred. The overhead of the action executed by bad stripe collector 801 is minimized, since all data for map tree and remap tree are stored in the memory.

In a further embodiment of the present disclosure, priority controller 802 is configured to determine a reconstruction priority level for each bad storage unit based on whether each bad storage unit is located at a medium error detected area on the storage device, and/or determine a reconstruction priority level of each bad storage unit based on the number of damaged sub-storage units (e.g., bad stripe units SUs) included in the each bad storage unit. For example, taking RAID-6 as an example, bad stripes therein may be set at five priority levels as shown in Table 1.

According to a further embodiment of the present disclosure, storage device comprises a plurality of array objects, and priority controller 802 (FIG. 8) is configured to, for each array object of the storage device, manage a bad storage unit pool for maintaining information of all bad storage units for reconstruction. A further embodiment may include dividing bad storage units in a bad storage unit pool into a plurality of schedule groups with different priority levels. In a further embodiment, for example, take the de-clustered RAID, a RAID is divided into a logical domain and a physical domain. In a further embodiment, data protection may be implemented in a logical domain so as to output an array object, and it may be assumed that RAID-6 algorithm may be used to enable high reliability the data. In a further embodiment, inside each array object, there may be a bad stripes pool managed. In a further embodiment, in order to separate bad stripes (namely, bad storage units) into groups with different priority levels, five schedule groups may be managed inside a bad stripes pool, wherein each schedule group may have a different priority level. In a further embodiment, for example, a schedule group with a highest priority may manage all stripes with more than two bad SUs to be reconstructed, and a schedule group with lowest priority may manage all stripes with one bad SU.

In some embodiments of the present disclosure, reconstruction scheduler 803 (FIG. 8) may be configured to select a schedule group to be reconstructed from a high priority level to a low priority level according to priority levels of a plurality of schedule groups; and after selecting a schedule group to be constructed, execute reconstruction sequentially for all bad storage units in the selected schedule group. In another embodiment, reconstruction scheduler 803 may be further configured to, after selecting a schedule group to be constructed, select a block stripe sequentially from the selected schedule group, wherein the block stripe comprises a plurality of continuous storage units; and execute reconstruction sequentially for all bad storage units in the selected block stripe.

In one embodiment, priority-based reconstruction is implemented by an apparatus for management of the storage device according to embodiments of the present disclosure. In a further embodiment, priority-based reconstruction may imply that bad storage units (e.g., the bad stripes in the RAID) to be reconstructed may be schedulable. In a further embodiment, using a priority-based reconstruction apparatus, a process of reconstruction may become smart enough to select a suitable scheduling order to reconstruct a bad storage unit, instead of just implementing data recovery from begin to end sequentially. In an embodiment, taking RAID for an example, after critical bad storage units (e.g., bad stripes) are handled, RAID may step out more quickly from a vulnerable state into a safe state, and since a duration time of a vulnerable state becomes shorter, data reliability may be improved while RAID in the degraded state.

According to an embodiment of the present disclosure, reconstruction scheduler 803 may be further configured to execute a reconstruction scheduling in parallel for each array object in a plurality of array objects included by a storage device, e.g., execute step S403 as shown in FIG. 4 in parallel for each array object. In another embodiment, reconstruction scheduler 803 may be further configured to execute a schedule reconstruction in series for a plurality of array objects included by a storage device.

In a further embodiment, a storage device is divided into a logical domain and a physical domain, wherein the logical domain is used to implement data protection and the physical domain is used to manage the physical storage device. In a further embodiment, a logical domain may include array objects that may be built based on a plurality of logical unit numbers (LUNs). In a further embodiment an address space of LUN may be divided into multiple blocks. In a further embodiment each block may include a plurality of stripe units SU. In a further embodiment a plurality of SUs from different LUNs may form a storage unit (e.g., bad stripe). In a further embodiment, and a plurality of blocks from different LUNs may form a block stripe. In a further embodiment, a physical domain may include a plurality of physical storage devices. In a further embodiment, each of a plurality of physical storage devices may include a plurality of chunks. In a further embodiment, blocks in a logical domain may be mapped to chunks in a physical domain.

Figure 9:
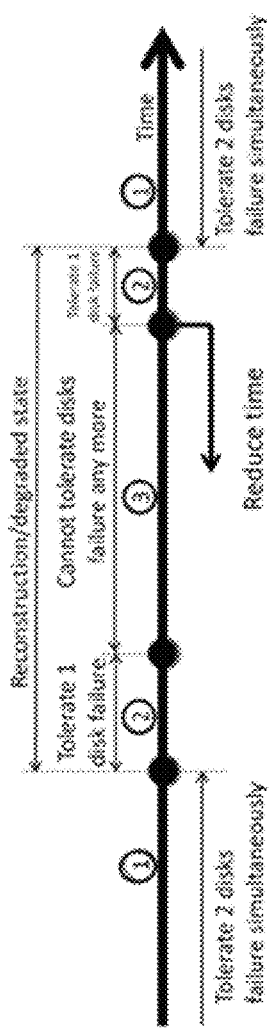
FIG. 9 schematically illustrates an exemplary schematic diagram about reducing duration time of the vulnerable state of a storage device by using the method according to an embodiment of the present disclosure.

In one embodiment, through method 400 and apparatus 800, a duration time in a vulnerable state may be shortened, and data reliability during reconstruction time period may be significantly improved. FIG. 9 illustrates changes of the duration time of a storage device in a vulnerable state. As can be seen from FIG. 9, the duration time in a vulnerable state can be shortened by the method and apparatus according to embodiments of the present disclosure. It is to be noted that even though FIG. 9 illustrates three states, the number of states may vary depending on a redundancy degree of the storage device, so embodiments of the present disclosure are by no means limited to this. In one embodiment, for example, four states may exist for a storage device that may tolerate three disk errors, and the four states are respectively a state that may tolerate three disk errors, a state that may tolerate two disk errors, a state that may tolerate one disk error, and a state that may not tolerate other disk errors.

Figure 10:
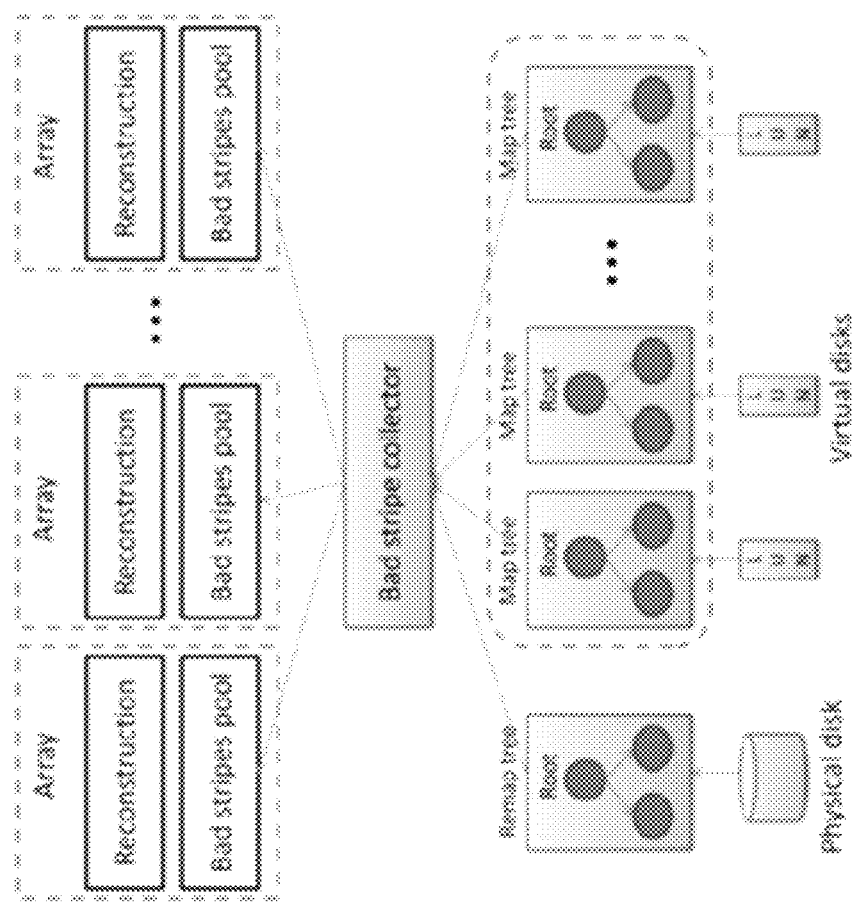
FIG. 10 schematically illustrates an exemplary structural schematic diagram of priority-based reconstruction in the declustered RAID according to an embodiment of the present disclosure.

FIG. 10 illustrate an exemplary architecture of an apparatus according to an embodiment of the present disclosure, wherein an exemplary bad stripe collector as bad storage unit collector 801 may be used to collect all bad stripes of all arrays. In a de-clustered RAID, once one disk fails, all stripes in all arrays will be affected. Hence, a bad stripe collector may be used to collect all bad stripes in all arrays. In addition to disk failure during system running, after a system reboots and a storage device is reassembled, bad stripe collector may also check whether bad stripes exist. The bad stripes collector is a significant part of a reconstruction module. In one embodiment, a challenge may lie in how to ensure that all bad stripes may have been collected. In a further embodiment, for instance, while a system reboots, and one disk may be removed from RAID, how may a check made for affected stripes in all arrays. As stated above, according to an embodiment, a check may be fulfilled by a bad stripe collector based on a map tree or a remap tree. In the example embodiment shown in FIG. 10, each array may have a bad stripes pool to maintain all bad stripes information for reconstruction, and it may be characterized in that bad stripes inside a bad stripe pool have different priority levels. In a further embodiment, priority levels may be determined by a priority controller as illustrated in FIG. 8. In a further embodiment, reconstruction scheduler may pick up bad stripes from a bad stripes pool and then performs reconstruction. In a further embodiment, as compared to traditional method/apparatus, bad stripes may be picked up from a bad stripe pool based on priority levels instead of being picked up one by one from begin to end. In a further embodiment, as compared to traditional RAID reconstruction method/apparatus, a bad stripes collector and a priority-based bad stripe pool may be central to realize priority-based reconstruction.

Figure 11:
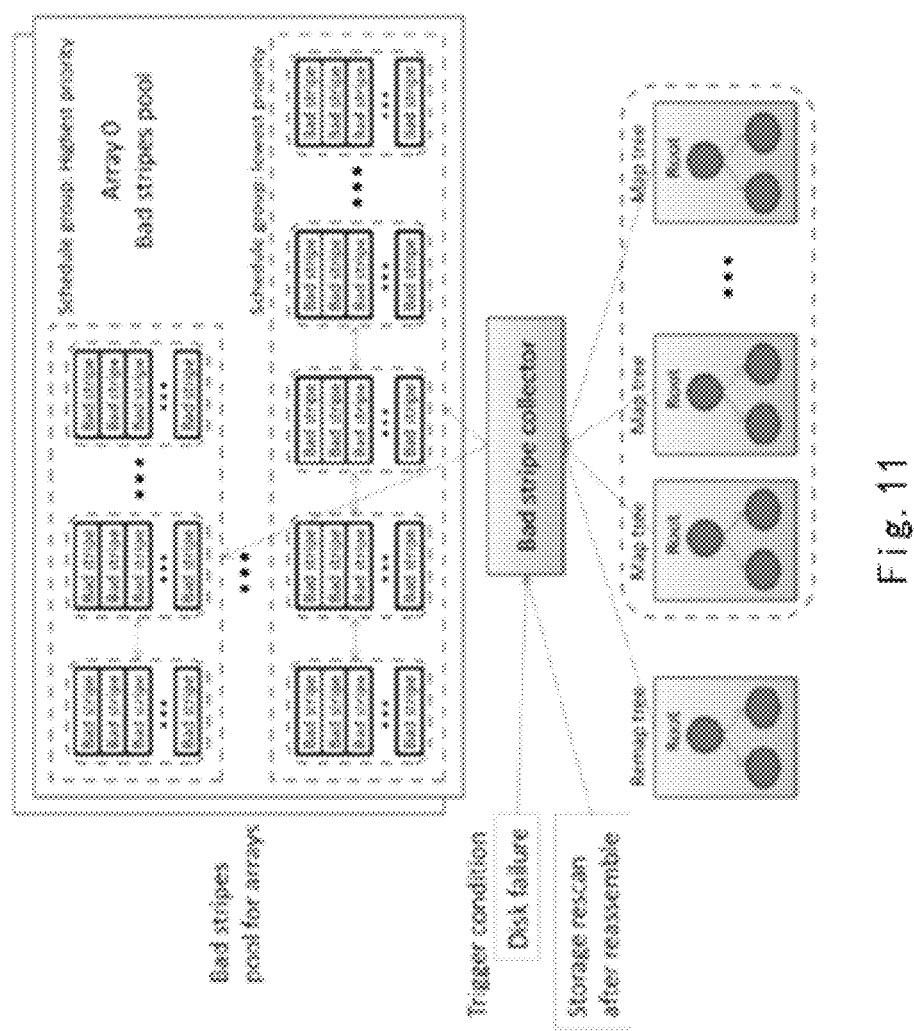
FIG. 11 schematically illustrates an exemplary schematic diagram of an operation principle of an apparatus for management of a storage device according to an embodiment of the present disclosure.

According to another embodiment of the present disclosure, FIG. 11 illustrates a schematic diagram of an operation principle of an apparatus for management of a storage device. In one embodiment, take a de-clustered RAID as an example, the RAID may be divided into a logical domain and a physical domain. In a further embodiment, data protection may be implemented in a logical domain so as to output an array object. In a further embodiment, inside each array object, there may be a bad stripes pool managed. In a further embodiment, in order to separate bad stripes into groups with different priority levels, a plurality of schedule groups may be managed inside a bad stripes pool, wherein each schedule group has a different priority level. In a further embodiment, for example, a schedule group with a highest priority level may manage all stripes with more than two bad SUs to be reconstructed and a schedule group with a lowest priority level may manage all stripes with one bad SU. In a further embodiment, a bad stripe collector may operate based on a trigger condition. In a further embodiment, as stated previously, a trigger condition may be that a physical storage device such as a disk may fail during system running, or scanning may be performed after a system reboots and physical storage device (e.g., a disk) may be found missing. In a further embodiment, as stated previously with reference to FIG. 4, a specific method for reconstruction for a selected bad stripe may be identical with a conventional method.

The above method and apparatus described with reference to FIG. 4 and FIG. 8 may be implemented in a Data Domain de-clustered RAID. In a further embodiment, the method and apparatus may improve data reliability in case two disks fail for RAID-6. Advantages embodiments will be described below from three aspects.

1) The percentage of stripes with two bad SUs

Figure 12:
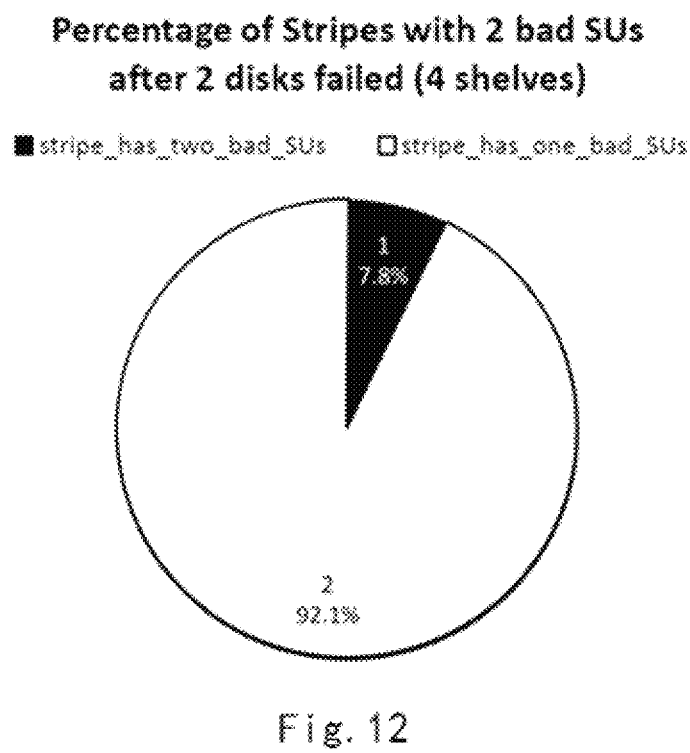
FIG. 12 schematically illustrates an exemplary percentage of bad stripes with two bad SUs in the storage device (4 shelves configuration)
Figure 13:
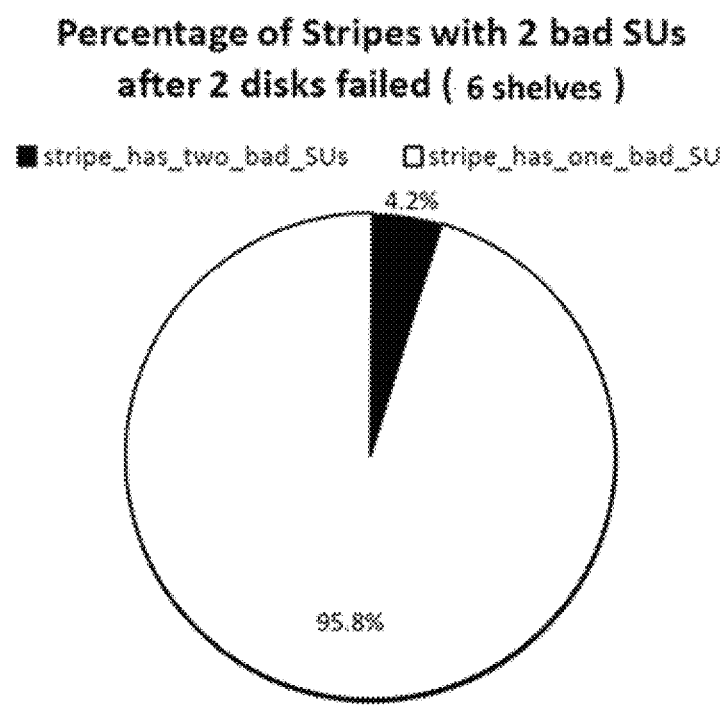
FIG. 13 schematically illustrates an exemplary percentage of bad stripes with two bad SUs in the storage device (6 shelves configuration)

In order to test reliability of stored data, make two disks in a de-clustered RAID with 4 shelves configuration fail simultaneously, and it may be found that there may be up to 7.8% bad stripes having 2 bad SUs, as shown in FIG. 12. Additionally, the same test may be performed for 6 shelves configuration, and it may be found that there may be only up to 4.2% bad stripes have 2 bad SUs, as shown in FIG. 13.

The conclusion for these two tests can be summarized as below:

There are not too many bad stripes with two bad SUs. If those bad stripes can be handled as fast as possible with a high priority level, RAID will not stay in a vulnerable state for a long time, and data reliability may be improved in a degraded stage of RAID.

In case of more shelves, there may be less stripes with two bad SUs after two disks failed. That means, in case of more shelves, the time of staying in a vulnerable state will be shorter after two disks failed, by scheduling reconstruction with priority for a bad strip with two bad SUs.

2) Tolerate more failure disks

Figure 14:
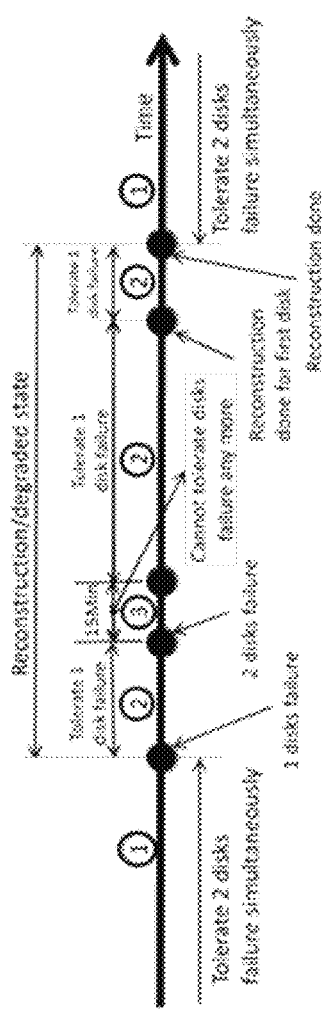
FIG. 14 schematically illustrates an exemplary schematic diagram about reducing duration time of the vulnerable state by using an embodiment of the present disclosure.

Based on a prototype, two disks for RAID-6 may be removed simultaneously. And after about 15 minutes, another disk may be removed from RAID. Test shows that RAID may still work without data loss. The reason may be that by using priority-based reconstruction, the time of staying in a vulnerable state is reduced into a very short time. As shown in FIG. 14, for 6 shelves configuration in a de-clustered RAID, the time of a vulnerable state may be reduced into about 15 minutes, which means, 15 minutes after two disks failed, RAID may tolerate a third disk failure for RAID-6. Obviously, priority-based reconstruction may improve data reliability during data reconstruction period.

3) Advantages

As compared with the existing approach, the method/apparatus for management of a storage device according to an embodiment of the present disclosure may reduce duration time in a vulnerable state dramatically. Reference can be made to FIG. 9 and FIG. 14 for detail comparison results. With the method/apparatus described herein, duration time of a storage device in a vulnerable state may be reduced to about 15 min, whereas existing approach may take hours.

In summary, embodiments of the present disclosure propose a method/apparatus for management of a storage device so that during a reconstruction time period, priority-based schedule and reconstruction may be made for a bad storage device to reduce a duration time of a storage device staying in a vulnerable state. Although embodiments of the method/apparatus proposed by the present disclosure are described mainly with the de-clustered RAID as an example, those skilled in the art can appreciate that embodiments of the present disclosure are not limited to this.

Those skilled in the art should appreciate that any structural diagram described here represents an explanatory schematic diagram for implementing the principles of the disclosure. Similarly, it should be understood that the flowchart described here represents various processes that can be specifically represented in a machine-readable medium and can be implemented by a machine or a process device, no matter whether such machine or process device is indicated.

Those skilled in the art should also understand that each unit included in apparatus 800 according to the embodiments of the disclosure can be implemented in various manners, comprising software, hardware, firmware or any combinations thereof. For example, in some embodiments, apparatus 800 can be implemented by software and/or firmware. Alternatively or additionally, apparatus 800 can be implemented partly or fully based on hardware. For example, one or more units in apparatus 800 can be implemented as integrated circuit (IC) chip, application specific integrated circuit (ASIC), system-on-chip (SOC), and field programmable gate array (FPGA) etc. The scope of the disclosure is not restricted in this regard.

The disclosure can be a system, a device, an apparatus, a method and/or a computer program product. According to one embodiment of the disclosure, an apparatus comprising at least one processor; and at least one memory including computer program codes, may be implemented, wherein the at least one memory and computer program codes are configured to cause the apparatus to implement any of the above method described with reference to FIG. 4. According to another embodiment, a computer program product, the computer program product being embodied in a computer-readable medium and comprising a computer-readable program instruction; and the computer-readable instruction may implement any method according to embodiments of the disclosure upon being loaded into the apparatus.

The above descriptions with reference to the drawings are only provided for exemplary purpose to illustrate the disclosure. Those skilled in the art can understand that different structures can be proposed based on the above described principles of the disclosure. Although these different structures are not clearly described or indicated here, they all embody the principles of the disclosure and are included within the spirit and scope. Furthermore, all examples proposed herein are clearly for the purpose of teaching to help the reader to understand the principles of the disclosure. They should not be understood as limitations to the scope of the disclosure. Besides, the depictions about the principles, aspects and embodiments of the disclosure and their specific examples include their equivalents.

What is claimed is:

1. A method for managing a storage device, comprising: collecting bad storage units to be reconstructed in a storage device, wherein the storage device is degraded to a vulnerable state due to the bad storage units;
determining a reconstruction priority level for each of the collected bad storage units; and
scheduling reconstruction of the bad storage units based on the reconstruction priority level to reduce a duration time of the vulnerable state and improve data reliability during the reconstruction.

2. The method according to claim 1, wherein the storage device is a de-clustered Redundant Array of Independent Disks (RAID), and the bad storage unit is a bad stripe.

3. The method according to claim 1, further comprises:
scanning at least one of a map tree or a remap tree of the storage divide for collecting the bad storage units to be reconstructed.

4. The method according to claim 1, further comprises:
determining a reconstruction priority level for each bad storage unit based on at least one of whether each of the bad storage unit is located at a medium error detected area on the storage device, or a number of damaged sub-storage units included in each of the bad storage unit.

5. The method according to claim 1, wherein the storage device comprises a plurality of array objects further comprises:
for each array object the plurality of array object of the storage device, managing a bad storage unit pool for maintaining information of all bad storage units for reconstruction; and
dividing bad storage units in the bad storage unit pool into a plurality of schedule groups with different priority levels.

6. The method according to claim 5, further comprises:
selecting a schedule group to be reconstructed according to an descending order of the priority levels of the plurality of schedule groups; and
executing reconstruction sequentially for all bad storage units in the selected schedule group after selecting the schedule group to be constructed.

7. The method according to claim 6, further comprises:
selecting a block stripe sequentially from the selected schedule group after selecting the schedule group to be constructed, wherein the block stripe comprises a plurality of continuous storage units; and
executing reconstruction sequentially for all bad storage units in the selected block stripe.

8. The method according to claim 5, further comprises:
scheduling reconstruction in parallel for each of the plurality of array objects included in the storage device.

9. The method according to claim 8, wherein the storage device is divided into a logical domain and a physical domain, wherein the logical domain is used to implement data protection and the physical domain is responsible for management of the physical storage device; and
the logical domain comprises a plurality of array objects which are built based on a plurality of logical unit numbers (LUNs); an address space of the LUNs is divided into multiple blocks; each
block comprises a plurality of sub-storage units; and a plurality of sub-storage units from different LUNs form one storage unit, and a plurality of blocks from different LUNs form a block stripe;
the physical domain comprises a plurality of physical storage devices; each of the plurality of physical storage devices comprises a plurality of chunks; and
the blocks in the logical domain are mapped to the chunks in the physical domain.

10. An apparatus for management of a storage device, the apparatus configured to:
collect bad storage units to be reconstructed in a storage device, wherein the storage device is degraded to a vulnerable state due to the bad storage units;
determine a reconstruction priority level for each of the collected bad storage units; and
schedule reconstruction of the bad storage unit based on the determined reconstruction priority level to reduce a duration time of the vulnerable state and improve data reliability during the reconstruction.

11. The apparatus according to claim 10, wherein the storage device is a de-clustered Redundant Array of Independent Disks (RAID), and the bad storage unit is a bad stripe.

12. The apparatus according to claim 10, further configured to:
collect bad storage units to be reconstructed by scanning at least one of a map tree or a remap tree of the storage device.

13. The apparatus according to claim 10, further configured to:
determine a reconstruction priority level for each bad storage unit based on at least one of
whether each of the bad storage unit is located at a medium error detected area on the storage device, or
a number of damaged sub-storage units included in the each of the bad storage unit.

14. The apparatus according to claim 10, further configured to:
for each array object of a plurality of array objects of the storage device, manage a bad storage unit pool for maintaining information of all bad storage units for reconstruction; and
divide bad storage units in the bad storage unit pool into a plurality of schedule groups with different priority levels.

15. The apparatus according to claim 14, further configured to:
select a schedule group to be reconstructed according to a descending order of the priority levels of the plurality of schedule groups; and
execute reconstruction sequentially for all bad storage units in the selected schedule group after selecting the schedule group to be constructed.

16. The apparatus according to claim 15, further configured to:
select a block stripe sequentially from the selected schedule group after selecting the schedule group to be constructed, wherein the block stripe comprise a plurality of continuous storage units; and
execute reconstruction sequentially for all bad storage units in the selected block stripe.

17. The apparatus according to claim 14, further configured to:
execute scheduling reconstruction in parallel for each of the plurality of array objects included in the storage device.

18. The apparatus according to claim 17, wherein the storage device is divided into a logical domain and a physical domain, wherein the logical domain is used to implement data protection and the physical domain is responsible for management of the physical storage device; and
wherein the logical domain comprises a plurality of array objects which are built based on a plurality of logical unit numbers LUNs; an address space of LUNs is divided into multiple blocks; each block comprises a plurality of sub-storage units; and a plurality of sub-storage units from different LUNs form one storage unit, and a plurality of blocks from different LUNs form a block stripe;
the physical domain comprises a plurality of physical storage devices; each of the plurality of physical storage devices comprises a plurality of chunks; and
the blocks in the logical domain are mapped to the chunks in the physical domain.

19. A computer program product comprising a non-transitory computer readable medium encoded with computer executable program code, wherein the code enables execution across one or more processors for
collecting bad storage units to be reconstructed in a storage device, wherein the storage device is degraded to a vulnerable state due to the bad storage units;
determining a reconstruction priority level for each of the collected bad storage units; and
scheduling reconstruction of the bad storage units based on the reconstruction priority level to reduce a duration time of the vulnerable state and improve data reliability during the reconstruction.

* * * * *